(No Model.)
D. MASON.
CONTROLLING AND EQUALIZING ELECTRIC MOTORS.
No. 496,522. Patented May 2, 1893.
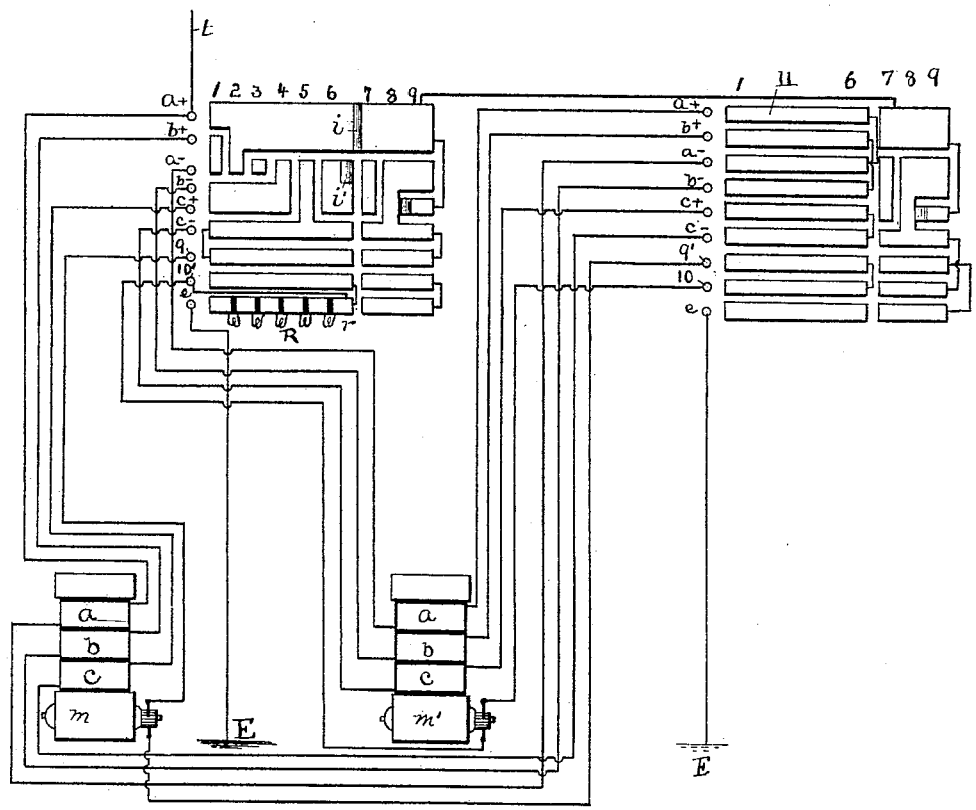
Witnesses
Norris F. Clark,
N. F. Oberly.
Inventor
D. Mason
By his Attorney
Dyer & Seely.

UNITED STATES PATENT OFFICE.

DAVID MASON, OF SCHENECTADY, NEW YORK, ASSIGNOR TO THE GENERAL ELECTRIC COMPANY, OF NEW YORK.

CONTROLLING AND EQUALIZING ELECTRIC MOTORS.

SPECIFICATION forming part of Letters Patent No. 496,522, dated May 2, 1893.

Application filed April 22, 1892. Serial No. 430,190. (No model.)

*To all whom it may concern:*

Be it known that I, DAVID MASON, a citizen of the United States, residing at Schenectady, county of Schenectady, and State of New York, have invented a certain new and useful Improvement in Controlling and Equalizing Electric Motors, of which the following is a specification.

The present invention relates to a method of and apparatus for controlling and equalizing the action or operation of several connected electrical motors, each of which has one or more field-magnet coils.

The objects of the invention are to so arrange and handle the motors that their load may be started gradually and with perfect safety to the motors without using a large idle resistance, to cause the motors to work uniformly, and to avoid arcing at the switch.

The invention consists in the method of commutating the motor coils and motors, and in the apparatus therefor, hereinafter described and set forth in the claims.

In an application of even date herewith I have described the method of controlling several motors consisting in using one or more motors as starters for other motors by connecting the coils of the first mentioned motors in series and the motors in series, commutating the coils to reduce their resistance, and finally throwing the motors into multiple arc. The present invention, while bearing some resemblance to said method, constitutes an improvement thereon. In the present case all of the motors are, preferably, though not necessarily, provided with several field-magnet coils and these are simultaneously controlled. The circuit connections and the switching apparatus are so arranged that the coils of the several motors alternate, and when the motors are in multiple the field coils of one machine are connected to the armature of another machine.

The drawing is a diagram illustrating two motors with their circuit connections and switches.

The motors $m, m'$ are each provided, in the case illustrated, with three field-magnet coils $a, b, c$.

The switch comprises two sections of contact plates 11, the general shape and relative arrangement of which are indicated in the upper part of the figure.

The two series of circles $a^+, b^+$, &c., indicate switch brushes or contact devices adapted to make contact with the two series of switch plates, the two series of plates and brushes being movable relative to each other.

In practice it is preferable to mount the two series of contact plates on the surface of a single drum which can be turned by a suitable handle, and to arrange the contact devices adjacent to the surface of the drum so that the two series will make contact with their switch plates at the same time when the switch is moved. The trolley or supply wire $t$ is connected to the first brush at the left of the figure. The positive terminals of the coils of motor $m$ are connected to the brushes $a^+$, $b^+, c^+$ on the first section of the switch, while the negative terminals of said coils are connected to the brushes $a^-, b^-, c^-$ at the second section of the switch. The coils of the motor $m'$ are oppositely connected, that is, the positive terminals of the field-magnet coils are connected to $a^+, b^+, c^+$ at the second section of the switch, and the negative terminals to $a^-$, $b^-, c^-$ at the first section. The armature of the first motor, $m$, is connected to brush 9 at one section of the switch, and 9' at the second section, while the armature of $m'$ is connected to brushes 10 and 10', 10' being also connected to the last resistance plate $r$. $e$ are brushes connected to earth.

By tracing out the circuits it will be found that when the switch is moved to bring the brushes $a^+$, &c., to the position marked 1, all of the field-magnet and armature coils of both motors, and the resistances, will be in series, and the coils of the two motors will alternate. As the switch is moved along to the positions 2, 3, 4, 5, &c., several commutations will take place, and at the same time resistance will be cut out, reducing the resistance of the motor circuit and increasing the power of the motor. At the position 6 all of the resistance R will be out of circuit, the coils $a$ of the two motors will be in series, the coils $b$ of the two motors will be in series, but the coils $a\ a, b\ b$ will be in multiple arc with each other, and these will be in series with the coils $c\ c$ and with the armatures. Up to this point the several commutations are made while the series connection of the motors is maintained; the next movement opens a part of the coils, as above described, and throws the motors into multiple arc, with the coils $a$, $b$ of each motor in multiple arc but in series with the coil $c$ of the other motor, and connects the final field coil terminal of one motor to the armature of the other motor. When the switch occupies the position 9, the motors will be in multiple arc and all the field-magnet coils of each motor will be in multiple arc, thus giving the maximum power and speed. By using the resistance R the operator is obliged to move the switch along a considerable distance before getting up speed; the motors are controlled conjointly by changing the resistance and by commutating the coils, and the resistance serves to reduce sparking.

In passing from the series to the multiple arc connection it is desirable to make further provision to avoid injurious arcing or sparking. To accomplish this end I insert at the suitable points insulating rounded ribs $i\ i'$, adapted to press back the contact devices. It will be seen that the rib $i'$ first opens the circuit of coils $a$, $a$, and then rib $i$ opens the circuit of coils $b$, and finally the motors, thus reduced, are thrown into multiple arc. By cross connecting or inter-connecting the motor coils as indicated, the motors are to a large extent rendered dependent on each other, their action being thus equalized, and a large number of commutations can be obtained in a very simple and easy manner.

While only two motors are shown, the invention is not limited to this number.

What I claim is—

1. The improvement in controlling several motors which consists in connecting them in series in such manner that the coils of the different motors are cross connected or intermingled, changing the connection of the coils while maintaining the series connection of the motors, and then throwing the motors into multiple arc, substantially as described.

2. The improvement in controlling several motors which consists in connecting them in series in such manner that the coils of the different motors are cross connected or intermingled, and then throwing the motors into multiple arc, substantially as described.

3. The improvement in simultaneously controlling several motors, each having several coils, which consists in connecting the several motors in series, in such manner that the coils of the different motors alternate, changing the connection of the motor coils while maintaining the series connection of the motors, and then when greater power or speed is desired, throwing the motors into multiple arc, substantially as described.

4. The improvement in simultaneously controlling several motors, each having several coils, which consists in connecting the several motors in series, in such manner that the coils of the different motors alternate, changing the connection of the motor coils while maintaining the series connection of the motors, and then when greater power or speed is desired throwing the motor coils and also the motors into multiple arc, substantially as described.

5. The improvement in controlling several motors which consists in connecting them in series so that the coils of the different motors are cross connected or intermingled, changing the connection of the coils and cutting out artificial resistance while maintaining the series connection of the motors, and then when greater power or speed is required, throwing the motors into multiple arc, substantially as described.

6. The combination with several motors, of switch apparatus for controlling the same, said switch apparatus having contact devices so arranged as to connect the coils of the motors in series alternately, substantially as described.

7. The combination with several motors, each having several coils, of switch apparatus for controlling the same, said switch apparatus having contact devices so arranged as to connect the coils of the motors in series alternately, and having also contacts so arranged as to commutate the coils, and then to throw the motors into multiple arc, substantially as described.

8. The combination with several motors, each having several coils, of switch apparatus for controlling the same, said switch apparatus having contact devices arranged so as to connect the coils of the motors in series alternately, and having also contacts arranged to commutate the coils and then to throw the coils, or some of them, and also the motors into multiple arc, substantially as described.

9. The combination with several motors, of switch apparatus for controlling the same having contact devices arranged to connect the coils of the motors in series alternately, and having also contacts arranged to commutate the coils, artificial resistance and switch devices therefor operated with commutating switch, and means for throwing the coils, or some of them, and also the motors into multiple arc, substantially as described.

This specification signed and witnessed this 15th day of April, 1892.

DAVID MASON.

Witnesses:
 THEO. E. BUTTON,
 GEO. C. REILLEY.